United States Patent [19]

Welland

[11] Patent Number: 5,581,722
[45] Date of Patent: Dec. 3, 1996

[54] MEMORY MANAGEMENT UNIT FOR MANAGING ADDRESS OPERATIONS CORRESPONDING TO DOMAINS USING ENVIRONMENTAL CONTROL

[75] Inventor: Robert V. Welland, Menlo Park, Calif.

[73] Assignee: Apple Computer, Inc., Cupertino, Calif.

[21] Appl. No.: 311,911

[22] Filed: Sep. 26, 1994

Related U.S. Application Data

[63] Continuation of Ser. No. 769,995, Sep. 30, 1991, abandoned.

[51] Int. Cl.⁶ .............................. G06F 12/10; G06F 9/34
[52] U.S. Cl. ...................... 395/417; 395/416; 395/406; 395/670
[58] Field of Search .................................. 395/400, 425, 395/650, 417, 418, 600, 406, 700

[56] References Cited

U.S. PATENT DOCUMENTS

| | | | |
|---|---|---|---|
| 4,366,537 | 12/1982 | Heller et al. | 395/491 |
| 4,430,705 | 2/1984 | Cannavino et al. | 395/416 |
| 4,890,223 | 12/1989 | Cruess et al. | 395/417 |
| 4,926,322 | 5/1990 | Stimac et al. | 395/500 |
| 4,945,480 | 7/1990 | Clark et al. | 395/700 |
| 5,023,773 | 7/1991 | Baum et al. | 395/727 |
| 5,303,378 | 4/1994 | Cohen | 395/700 |
| 5,317,717 | 5/1994 | Cutler et al. | 395/490 |
| 5,319,760 | 6/1994 | Mason et al. | 395/406 |

OTHER PUBLICATIONS

Andrew W. Appel, John R. Ellis, and Kai Li, in "Real-time Concurrent Collection on Stock Multiprocessor", Proceedings of the Sigplan '88 conference on Programming Language Design and Implementation, ACM SIGPLAN Notices, vol. 23(7), Jul. 1988, pp. 11-20.

David A. Moon, "Garbage Collection in a Large Lisp System", ACM Symposium on Lisp and Functional Programming (Austin, Texas, Aug. 1984), pp. 235-246.

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A memory management unit (MMU) for controlling a CPU's right to access a memory in order to initiate performance of an operation. The MMU includes a translator for translating a virtual address issued by the CPU into a physical address, a domain number and a permission, and an environment controller for determining if a portion of the memory corresponding to the domain number can be accessed by the CPU. The translator includes a translation look-aside buffer (TLB) for generating the physical address, the domain number and the permission, provided an entry in a translation table of the TLB matches a page number component of the virtual address. The translator also includes translation table look-up logic which supplies entry information to the translation table of the TLB by finding a match for the page number component in the memory if a match cannot be found in the TLB. The translator also includes permission control logic which evaluates the permission and either stops the operation or allows it to continue to be performed. The MMU also typically includes a manager which has the ability, primarily based on the domain number, to override the decisions of the permission control logic.

20 Claims, 7 Drawing Sheets

MEMORY MANAGEMENT UNIT FOR MANAGING ADDRESS OPERATIONS CORRESPONDING TO DOMAINS USING ENVIRONMENTAL CONTROL

This is a continuation of application Ser. No. 07/769,995, filed Sep. 30, 1991, now abandoned.

FIELD OF THE INVENTION

The present invention relates generally to the field of memory address management and control for computer systems, and more particularly to a memory management unit for optimizing the handling and performance of address-oriented operations in a fault driven, object oriented computer system having a domain-based operating system. A related U.S. patent application Ser. No. 07/769,619, entitled "Memory Management Unit Having a Cross-Domain Control" was filed Sep. 30, 1991 by Robert V. Welland now U.S. Pat. No. 5,390,310 issued Feb. 14, 1995.

BRIEF DESCRIPTION OF THE PRIOR ART

The most basic task of an operating system is to give application programs an abstract environment in which to run. One natural, but unfortunate, result of this task when implemented is that application programs are often limited by the operating system's "idea" of the proper environment. If a program design does not conform to this environment, it must be reworked until it can be expressed in the operating system's terms, which is not only inconvenient for the user, but may also introduce inefficiency in the program. Problems with environmental restrictions are not only limited to application programs. The operating system itself can often incur considerable overhead as a result of maintaining virtual environment features that a particular application does not need. A further problem relates to the provision of multiple address spaces by most operating systems, which typically provide multiple independent address spaces with multiple threads of control in each. Although multiple address spaces are useful for isolating programs from one another, they often isolate them so well that they make it harder for the programs to cooperate. As a result, for example, implementation of shared code libraries is much more difficult with multiple address spaces than without.

Traditional operating systems also have significant limitations in the area of memory management. Over the years, particular hardware has been developed to help provide support for the most common memory management features of such operating systems. In particular, Memory Management Units (MMUs), in addition to providing memory access control, are now almost universally designed to optimize the implementation of demand-paged virtual memory on behalf of the operating system. An MMU, however, has traditionally been considered an added feature of a CPU, specifically designed to perform a particular address-oriented service, such as virtual memory, rather than as an integral unit upon which other system designs (such as the operating system) are based. Hence, the traditional MMU implementation also limits the manner in which the MMU can control the CPU's access to various addresses, thereby placing all of the burden of determining access to higher level system services on the operating system. In addition, since the operating system generally does not allow access to the lower-level operations that were used to implement such services, those operations cannot be utilized to perform other additional services. And even when some access is allowed, the access is severely constrained. For example, a programmer may have to write code to look like a virtual memory service, even when it isn't, just to obtain access to the appropriate lower-level operations.

As mentioned above, these types of design limitations make it difficult to use the MMU to perform additional tasks, such as concurrent garbage collection, which it should be able to perform, but which cannot be easily implemented using the traditional approach. Although a number of algorithmic solutions have been proposed that would enable an MMU to be able to perform these desired additional tasks, each solution has one or more problems which detract from its overall attractiveness to CPU developers and programmers. For example, Andrew W. Appel, John R. Ellis, and Kai Li, in "Real-time Concurrent Collection on Stock Multiprocessors", Proceedings of the SIGPLAN '88 Conference on Programming Language Design and Implementation, ACM SIGPLAN Notices, vol. 23(7), July 1988, pp. 11–20, describe an algorithm for implementing concurrent garbage collection using a traditional MMU. As previously noted, one problem with this type of approach, is that the effectiveness of the algorithm is hampered by limitations imposed by the operating system running on the CPU.

A different approach to garbage collection was described by David A. Moon in "Garbage Collection in a Large Lisp System", ACM Symposium on Lisp and Functional Programming (Austin, Tex., August 1984), pp. 235–246. Moon proposed utilizing special hardware to support garbage collection in a Lisp-based CPU. This implementation, however, restricts the hardware's application to a single algorithmic solution for garbage collection. In addition, many other algorithms running on the system, which are not related to garbage collection, would not benefit from such a system.

BRIEF SUMMARY OF THE INVENTION

A preferred embodiment of the present invention comprises a memory management unit (MMU) for controlling a CPU's right to access a memory in order to initiate performance of an operation. The MMU includes a translator for translating a virtual (processor) address issued by the CPU into a physical (memory) address, a domain number and a permission, and an environment controller for determining if a portion of the memory corresponding to the domain number can be accessed by the CPU. The translator includes a translation look-aside buffer (TLB) for generating the physical address, the domain number and the permission, provided an entry in a translation table of the TLB matches a page number component of the virtual address. The translator also includes translation table look-up logic which supplies entry information to the translation table of the TLB by finding a match for the page number component in the memory if a match cannot be found in the TLB. The translator also includes permission control logic which evaluates the permission and either stops the operation or allows it to continue to be performed. The MMU also typically includes a manager which has the ability, primarily based on the domain number, to override the decisions of the permission control logic.

BRIEF DESCRIPTION OF THE DRAWING

FIGS. 1b and 1c are block diagrams illustrating the relationship between tasks and the environments of FIG. 1a;

DETAILED DESCRIPTION OF THE PREFERRED EMBODIMENT

Figure 1A:
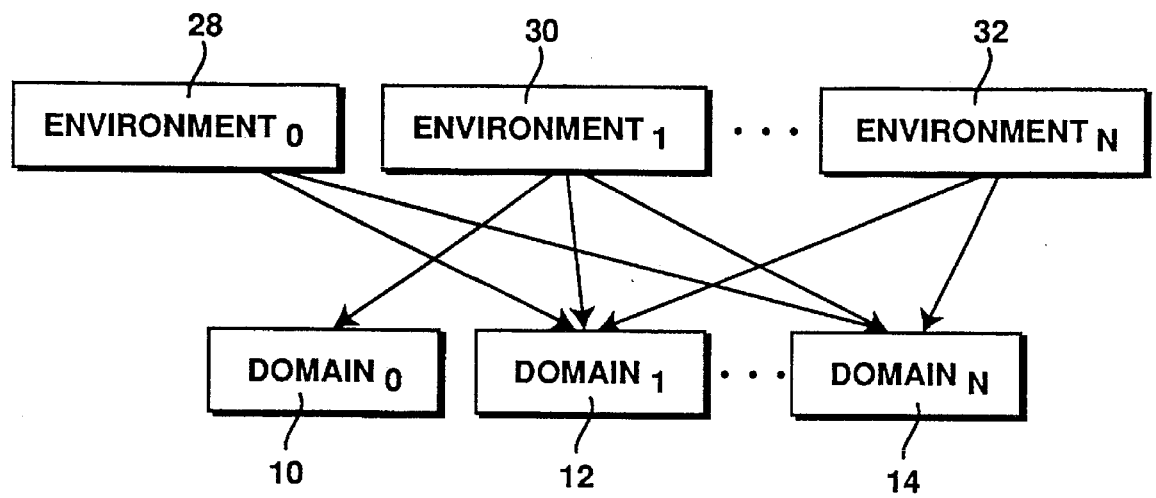
FIG. 1a is a block diagram illustrating the relationship between domains and environments in accordance with an operating system for use in conjunction with the memory management unit of the preferred embodiment of the present invention.

1.0 General Overview of the Present Invention

The present invention is related to a memory management unit for use in conjunction with a CPU running a particular type of operating system. This operating system is thoroughly described herein in order to provide a proper foundation for a description of the memory management unit of the present invention. What distinguishes this particular operating system from other types of operating systems is the novel memory management architecture employed, which is thoroughly described below. Particular attention is directed to the novel elements incorporated into the operating system through the memory manager, called "Domains" and "Environments", which help to simplify and optimize the handling and performance of address-oriented operations in a fault driven, object-oriented computer system. These same elements are also incorporated into the memory management unit of the present invention for further refinement and optimization of the handling and performance of address-oriented operations within the computer system.

Briefly, domains are created by partitioning the system address space into sets of addresses, which may or may not be contiguous. These address sets do not overlap so that each individual address is located in only one domain. Each domain is also defined by a set of protocols, or controls, that are used to manage the domain's address space, thereby affecting the execution of memory access operations by the CPU. As previously stated, domains and environments will be explained in greater detail below, but, before providing such a detailed description, it is necessary to provide a background of the atmosphere in which domains and environments are utilized.

1.1 General Functions of an Operating System

An operating system for a computer system manages a plurality of tasks that embody independently executing programs which run on the CPU. Each program is defined as a set of operations, or tasks, to be performed in some specified order and a set of data that is to be utilized during the performance of the operations. An operating system also provides a set of services that the tasks may utilize during the execution of their programs. A task that utilizes a particular service is said to be a client task of that service. The services provided by an operating system can be implemented as tasks that are activated when a service is requested by some client task. The task responsible for providing a particular service is called the manager task of that service.

There are many different types of operating systems, many of which are particularly designed for operation on a particular CPU. Despite the differences between such systems, there are some common features, including: a memory manager, a task manager, inter-process synchronization, and an input/output manager. Although each of these features is well known in the art, although maybe not by the provided names, a brief description of each is provided. A memory manager controls the use of memory addresses by application programs and by the operating system. A task manager is operative to create and destroy tasks and to manage the independent execution of tasks by the operating system in memory. Inter-process synchronization refers to the manner in which the exchange of information between tasks is managed. An input/output manager communicates with and controls the operation of input/output devices that define extensions of the computer system. In particular, the input/output manager supports the notion of secondary storage (disk storage) for use by the operating system. The present invention relates to a memory management unit for use in conjunction with an improvement of a memory manager of an operating system.

1.2 General Operation of a Memory Management Unit (MMU)

In a typical computer system, the central processing unit (CPU) fetches an instruction from memory and executes the operation encoded in the instruction. An operation may consist of one or more address operations, whereby the CPU emits an address and an access type that indicates the type of memory operation desired. Normally, the access type is either a read, write, or instruction fetch operation. A read operation instructs the memory system to read from the location specified by the address and to deliver the retrieved data to the CPU. A write operation provides data (in addition to the address and access type) to be written to the specified address. An instruction fetch operation typically functions identically to the read operation, only the access type, in this case, is used to indicate that the retrieved data will be used as an instruction. It should be noted that not all CPU designs differentiate between read operations and instruction fetch operations. By convention, however, all operations perform at least one address operation: that operation being the fetching of the instruction itself.

Address operations in most traditional computer systems are managed by an MMU. The MMU typically handles virtual addressing and it controls physical memory access by the CPU. The MMU sometimes has the additional responsibility of controlling access to various portions of memory in order to provide separation and protection of address spaces. The MMU translates virtual addresses provided by the CPU into physical addresses that correspond to storage locations in the computer system's primary memory, Random Access Memory (RAM). These virtual addresses are conventionally translated into physical addresses through use of a look-up table (called a "page table"), which can often be quite large. Since address translation by reference to a translation table stored in RAM can impose a generally unacceptable processing overhead, it is common practice to provide a high-speed cache of recently used address translations. Such a cache is commonly referred to as a translation lookaside buffer (TLB). The TLB stores a set of the most recently used virtual addresses, thereby making it possible to perform address translations in a single machine cycle.

If a requested virtual address does not have a translation in the TLB to a physical address, the translation must be retrieved from the page table in RAM, with the translation then being stored in the TLB. Retrieval of the translation from main memory is initiated by the detection of the absence of an appropriate TLB entry. If the appropriate translation information is not found in the page table, a "translation fault" is generated by the MMU. If appropriate translation information is found in the page table, it is loaded into the TLB and the memory access operation continues.

In normal MMU designs, the TLB also contains access permissions for each virtual address. Hence, if the table entry is valid, the access permissions in the translation entry are checked against the CPU access type. If the access type is allowed, the memory access is performed with the physical address provided by the TLB (assuming no other faults are raised, as will be explained later). If the access type is not allowed, a "permission fault" is generated for transmission to the CPU.

The purpose of a fault, such as the translation fault, is to notify the CPU of exceptional conditions that have occurred during the execution of an instruction. The transmission of a fault from the MMU to the CPU causes cancellation of the operation currently in progress, and execution (often through a vector table) of a fault handling routine by the CPU. When the operation is canceled, the CPU typically returns to the state it was in prior to the attempted execution of the operation that caused the fault. The fault handling routine determines the cause of the fault and acts on that cause. Unless the fault was a nonrecoverable fault, the CPU then continues execution of operations starting at the point of cancellation. In some computer systems, many faults may be combined into a single CPU fault. The particular fault which has occurred is therefore determined by examining a Fault Status Register. Faults may also be prioritized in such a way that certain faults mask (or inhibit) others. A Fault Dispatch Unit gathers the various fault sources, maintains the Fault Status Register, and asserts a single fault to the CPU.

2.0 Memory Address Management in the Operating System Used in Conjunction with the Present Invention The operating system described herein provides a flexible and general framework that allows users (system designers) to build desired features in order to control memory access. Although the operating system contains many cooperating tasks, some of the most significant, at least in terms of the present invention, are the address-oriented services, such as garbage collected heaps, persistent object stores, and virtual memory. These services are presented to their clients as special regions of memory, referred to above as "domains", that behave in particular ways and that keep the overhead of the operating system relatively low, thereby giving the user more freedom to trade features for hardware costs. This concept of memory address management, however, which underlies the operating system and which is further described below, can be significantly improved through use of the memory management unit of the preferred embodiment of the present invention.

2.1 Tasks, Environments and Domains

Figure 1B:
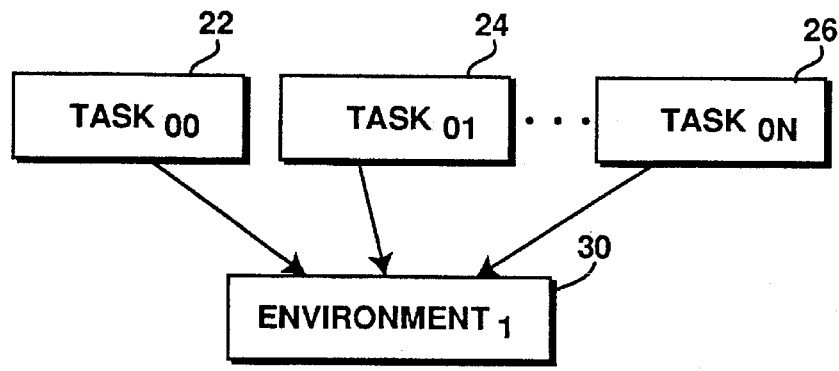
Figure 1C:
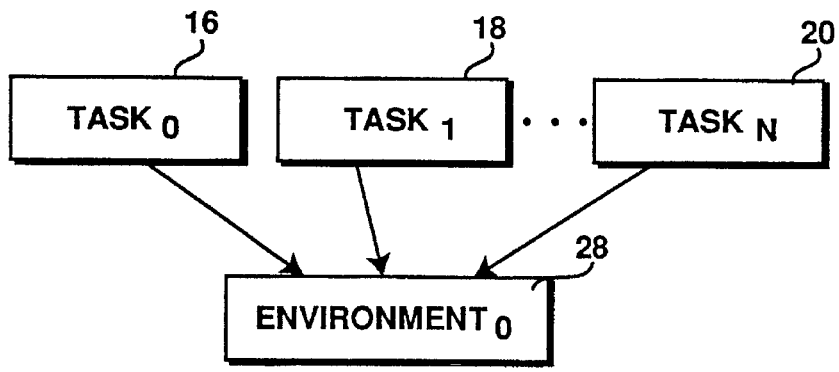

The memory manager of the operating system is designed to provide a framework that supports the operation of multiple address-oriented services. This framework is achieved, in part, by providing only a single address space for the entire system, by associating independent services with sets of addresses that define the services that a task is allowed to access, but that do not overlap, and by defining a set of addresses within that address space that a service will be allowed to manage, thereby preventing independent services from attempting to manage the same address in conflicting ways. More specifically, the address space of the system is partitioned into a set of domains, as described above, representing sets of addresses that may or may not be contiguous. Since these domains do not overlap, an address can only be associated with a single domain. The memory manager also utilizes environments (as defined herein), which control a task's access to the address space, and therefore the associated services, of one or more domains. Hence, with reference now to FIGS. 1a, 1b and 1c, the operating system's function of providing a set of services is achieved through the memory manager by associating a service with a particular domain (such as $Domain_1$ of domains 10 through 14 of FIG. 1a) which a task (such as $Task_0$ of tasks 16 through 26 of FIGS. 1b and 1c) has access to through an environment (such as $Environment_0$ of environments 28 and 32).

Although domains will be further explained below, it should also be noted at this point that each of these domains has an associated task, called its manager, which is in charge of providing the services associated with that particular domain. Domains are also associated with sets of controls which affect the execution of memory access operations, including virtual-to-physical translations and access permissions.

Figure 2:
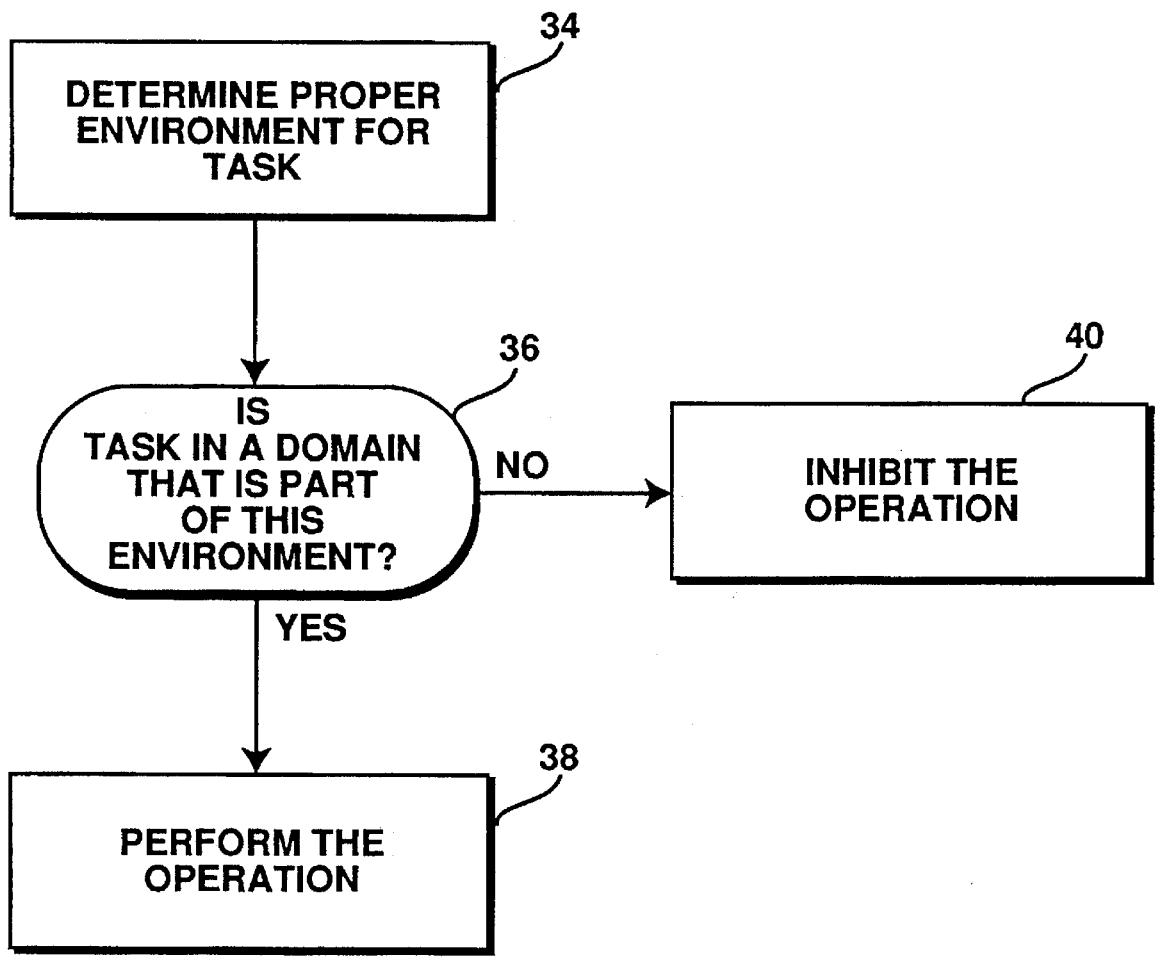
FIG. 2 is flow chart illustrating the operation of the operating system in accordance with the elements of the system illustrated in FIGS. 1a, 1b and 1c.

The functions of environments and domains in a computer system can be more fully described with reference now to FIGS. 2 and 3. The block diagram of FIG. 2 further illustrates the functional characteristics of the tasks, environments and domains depicted in FIGS. 1a, 1b and 1c. In step 34, an attempt is made to determine the proper environment for a task. When such an environment can be determined, an issue which will be further addressed below, the environment will then proceed to ask, in step 36, whether that task is in a domain which is part of that environment. If that task is in a domain in that environment, the operation of that task is allowed to be performed, step 38. Otherwise, the operation of that task is inhibited, step 40.

Figure 3A:
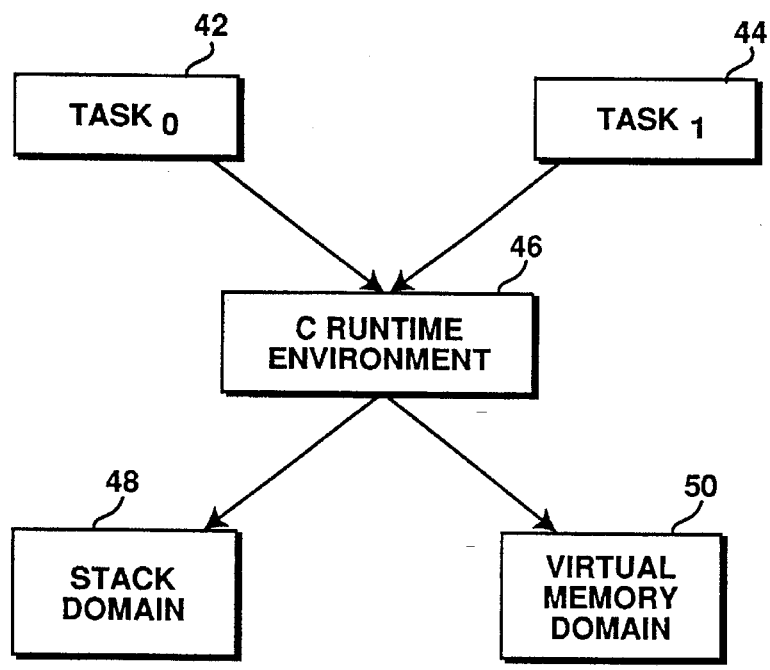
FIGS. 3a and 3b are block diagrams which illustrate two examples of where a particular environment can be utilized by the operating system to control a task's access to the address space of a domain.
Figure 3B:
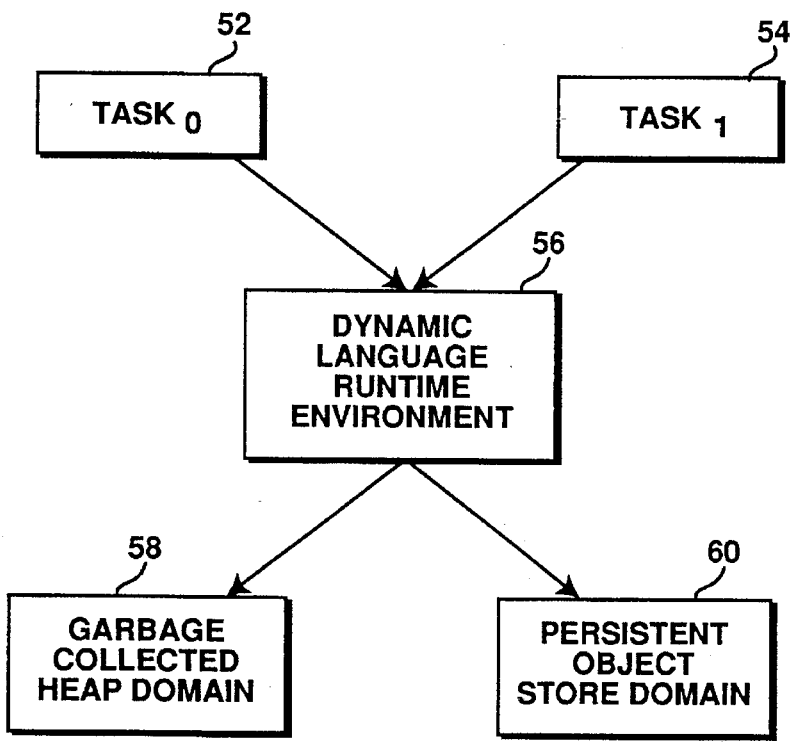

FIGS. 3a and 3b illustrate two examples of where a particular environment can be utilized to control a task's access to the address space of a domain in accordance with the principles illustrated in FIGS. 1a, 1b and 1c and 2. In FIG. 3a, the two tasks 42 and 44 represent the many tasks embodied by the programming language C, which would be running on the operating system. These tasks would be part of the C runtime environment 46, which controls the access of these tasks to the address space of various domains, such as the stack domain 48 and the virtual memory domain 50, as will be further explained below.

In FIG. 3b, the two tasks 52 and 54 represent the many tasks embodied by a dynamic language programming language, such as Lisp, which would run on the operating system. As in the situation illustrated in FIG. 3a, these tasks would be part of the dynamic language runtime environment 56, which controls the access of these tasks to the address space of various domains, such as the garbage collected heap domain 58 and the persistent object store domain 60, which are additional address-oriented services that are further described below.

2.2 Address Management Tools

In terms of the present invention, there are two primary types of address management tools: constraints and mappings. The following description of these tools should further assist to define the atmosphere in which domains are utilized and how some address-oriented services generally described above operate in this atmosphere. But before describing these tools, it is also necessary to describe faults, at least in the context of a fault-driven computer system, with respect to the operating system and memory management unit of the present invention. A fault is an event generated by the execution of an instruction. This execution process will halt and signal a fault if the appropriate conditions are met. The signal is usually passed to the manager of a domain, as determined by the type of fault and the operands of the instruction. Depending on the situation, the instruction may be restarted after the fault is handled.

2.2.1 Constraints

Constraints place restrictions on allowable address operations. Constraints include global constraints, access control barriers, and control-flow barriers. Global constraints accept one or more domain specifiers, as further described below, and information about the access type of an address operation. Global constraints then deliver a fault upon detection of an access violation.

A barrier is a restriction of read access, a restriction of write access, a restriction of the flow of addresses, or a restriction of the flow of control between domains. Violation of a barrier causes a fault to be signaled, which in turn causes some action to be taken. More specifically, there are three kinds of barriers: (i) A read barrier restricts tasks from reading from a location; (ii) A write barrier restricts tasks from writing addresses located in one domain into another domain; (iii) A control-flow barrier restricts program counter movement between domains. Because write barriers and control-flow barriers regulate the relations between domains they are called cross-domain restrictions.

A write barrier only applies when the data being written is an address. In order to implement write barriers, the system must be able to distinguish pointer data from non-pointer data, which is a common requirement of address-oriented services, such as garbage collectors.

2.2.2 Mappings

During instruction execution, various translations are performed on addresses. Mappings define these translations. Mappings work in conjunction with the domain classifier, as will be further described below. If a translation reveals a constraint, then the constraint is compared against the type of address operation. If the translation is missing, a translation fault is generated.

The most important mappings are the virtual address to physical address mappings, which are used to translate virtual addresses to physical addresses, and the virtual address to permission mappings, which are used to determine the types of access allowed to an address.

2.3 Address-Oriented Services

Many different types of address-oriented services, some of which are yet to be conceived, could be implemented through use of the operating system and memory management unit of the present invention. Although many of these services are generally known in the art, they are often described by prior art references in confusing or conflicting terms. Hence, in order to clarify the meaning of these services with respect to the present invention, some address-oriented services, presented in terms of the model of address management of the present invention, are described below.

2.3.1 Virtual Memory

A virtual memory service allows a program being executed by an operating system to effectively use more memory as RAM than there is actual physical RAM available in the computer system. Virtual memory is actually a portion of memory in a mass-storage device, such as a hard-disk drive. Hence, virtual memory is only virtual in terms of RAM. Clients of the virtual memory service, however, use this virtual memory as though it were all physically available RAM. The virtual address space is created by "swapping out" part of the data in RAM to the mass-storage device. This virtual memory is conventionally organized into a plurality of pages, each comprising a prescribed number of bytes, which are correlated with specific locations in RAM. The virtual memory service operates by intercepting a client's attempt to access pages of virtual memory that have been swapped out to disk, swapping the pages back into RAM (and possibly swapping some pages out of RAM if there is no room left), and then allowing the client to proceed.

Pages of virtual memory that have been mapped to pages of physical memory are referred to as "valid" pages, while pages of virtual memory that have no associated physical memory, and are either unallocated or are swapped out to disk, are referred to as "invalid" pages. When clients attempt to access invalid pages, the virtual memory service is typically notified by the MMU, which issues a fault called a "translation fault". Upon notification of a translation fault, the virtual memory service maps the physical RAM into pages, fills the pages of RAM with the appropriate data read from the storage device, and releases the pages so the clients can access them freely. When physical RAM becomes scarce, the virtual memory service needs to pick some valid pages and swap them out, once again preventing clients from accessing those pages.

In terms of the present invention, a simple paged virtual memory service works by manipulating only the address mapping for its domain. It maps the available physical memory to the valid (swapped-in) virtual pages in its domain, and unmaps the virtual pages that are swapped out. Such a simple implementation will perform more disk writes than necessary, since a page that has not been changed since it was swapped in need not be written to disk when it is swapped out. By giving clients read-only permission to a newly swapped-in page, the service can be notified when a client writes to it. That page can then be marked "dirty" and assigned read-write permission. Only dirty pages need to be written to disk. Thus, a more sophisticated virtual memory service will manipulate the permission mapping of its domain as well as the address mapping.

2.3.2 Garbage Collectors

In terms of a garbage collector service, garbage is storage that is no longer accessible by "legal" language operations. A garbage collector service finds garbage and makes that storage available for use by the operating system. Many garbage collector services do this by finding all storage objects that are not garbage and eliminating the rest. These "non-garbage" objects are found by recursively following all pointers contained in the storage objects of the system, starting at a set of root objects, which would include global variables and the processor state of all tasks. There are a number of different types of garbage collector services, three of which are described below.

2.3.2.1 Stop-and-Copy Garbage Collector

In accordance with the stop-and-copy garbage collector service, memory is divided into two regions, called "from-space" and "to-space". During normal execution, objects reside in to-space, and from-space is not used. When to-space is exhausted (or nearly so), processing halts. The identities of the spaces are then exchanged (flipped) so that from-space becomes to-space, and vice versa. The root objects are then copied into to-space, and the objects in to-space are then scanned for pointers into from-space. When such a pointer is found, the referenced object in from-space is copied to the end of to-space, where it will eventually be scanned, and the pointer in the object being scanned is updated to refer to the referenced object's new location. A forwarding pointer is left in place of each copied object, so later references to the object can be updated.

The above process has the effect of copying all of the reachable objects into to-space, and updating all of the pointers in the objects to refer to the locations of the copies. When all of the reachable objects have been copied, any objects left behind in from-space are considered garbage, from-space is reclaimed, processing is resumed, and the garbage collection service is repeated.

2.3.2.2 Concurrent Collector

The concurrent garbage collector service is like the stop-and-copy garbage collector service, except that: (a) it does not require the client to stop running while garbage collection occurs; and (b) it enforces a requirement that the client not be allowed to see addresses in from-space, and therefore cannot tell if garbage collection is incomplete. The restriction on clients' ability to see (read) addresses in from-space is a read barrier, which is implemented by manipulating the address-to-permission mapping of its domain. After the flip, all memory that could contain addresses in from-space is protected from client access by turning off the clients' read access; then the copying process begins. When a page in to-space has been scanned, all the pointers in that page have been translated into to-space pointers. This means that the client can access that page in memory without seeing from-space addresses; so the protection on that page can be removed. Hence, when a client attempts to access a protected page, the access is intercepted and the collector is signaled. The collector immediately proceeds to scan and translates that page, removes its protection, and allows the client to proceed.

2.3.2.3 Generation-Scavenging Collector

Most objects become garbage very soon after being allocated, if at all, so an old object is less likely to become garbage than a new object. Generation-scavenging collectors exploit this phenomenon by concentrating their effort on younger objects. Memory is divided into multiple regions called generations, which are ordered by age and can be independently scavenged (garbage-collected). Objects are created in the youngest generation. When an object has survived several scavenges, it is moved to the next-older generation. Older generations are scavenged less frequently than newer generations.

To scavenge generations independently, the collector must be able to determine which objects in a generation are referenced from other generations, since these objects must not be collected, even though there may not be any references to these objects within their own generation. To do this, the collector needs to keep track of pointers from older generations into newer ones, or in other words, detect addresses leaving their "home" generation. This is accomplished by constructing an address-flow barrier, wherein one domain is assigned to each generation, and operations that attempt to write an address in one domain into a location in another domain are intercepted. It should also be noted, that since it is uncommon for an object to reference younger objects, it is possible to only record references from older generations to newer generations, which can be done with little overhead. Because references from younger to newer objects are not remembered, it is necessary, when scavenging a generation, to scavenge all younger generations at the same time, which doesn't require much additional effort.

2.3.3 Persistent Object Store

For purposes of the present invention, a persistent object store means a collection of objects kept on a mass-storage device. Although the addresses of these objects may not be in the same format as addresses in memory (for example, store addresses may be 64 bits long and memory addresses only 32 bits), and these objects may contain pointers in this altered format, clients will still access these objects as though they were simply present in memory in the usual format with pointers in the format of memory addresses. When the store is opened, the root objects of the store are read into memory and translated to memory format. Virtual address space is allocated for the objects referenced by the root objects, but no physical memory is mapped into it, so the service is notified whenever clients attempt to read or write to this space. Upon notification, the service reads the appropriate object into memory and translates it, allocating space for the objects referenced by the object as before, and the process repeats.

A store of the type described above contains features of all of the above services. For example, it prevents clients from seeing persistent addresses by translating persistent objects on demand. In this way, it is similar to a concurrent garbage collector preventing its clients from seeing from-space addresses. The store manipulates the permission mapping of its domain to intercept reads and writes to untranslated pages. The store is also similar to a virtual memory service in that it dynamically assigns physical memory to the parts of the store that are resident in memory. It manipulates the address mapping of its domain to assign physical memory where it is needed. And, like the generation scavenging garbage collector, the store must detect cross-domain address operations. In particular, the store needs to know about pointers from persistent objects to transient objects so it can make those transient objects persistent, which is an address-flow barrier.

3.0 Formal Model of Memory Manager of the Operating System

Figure 4:
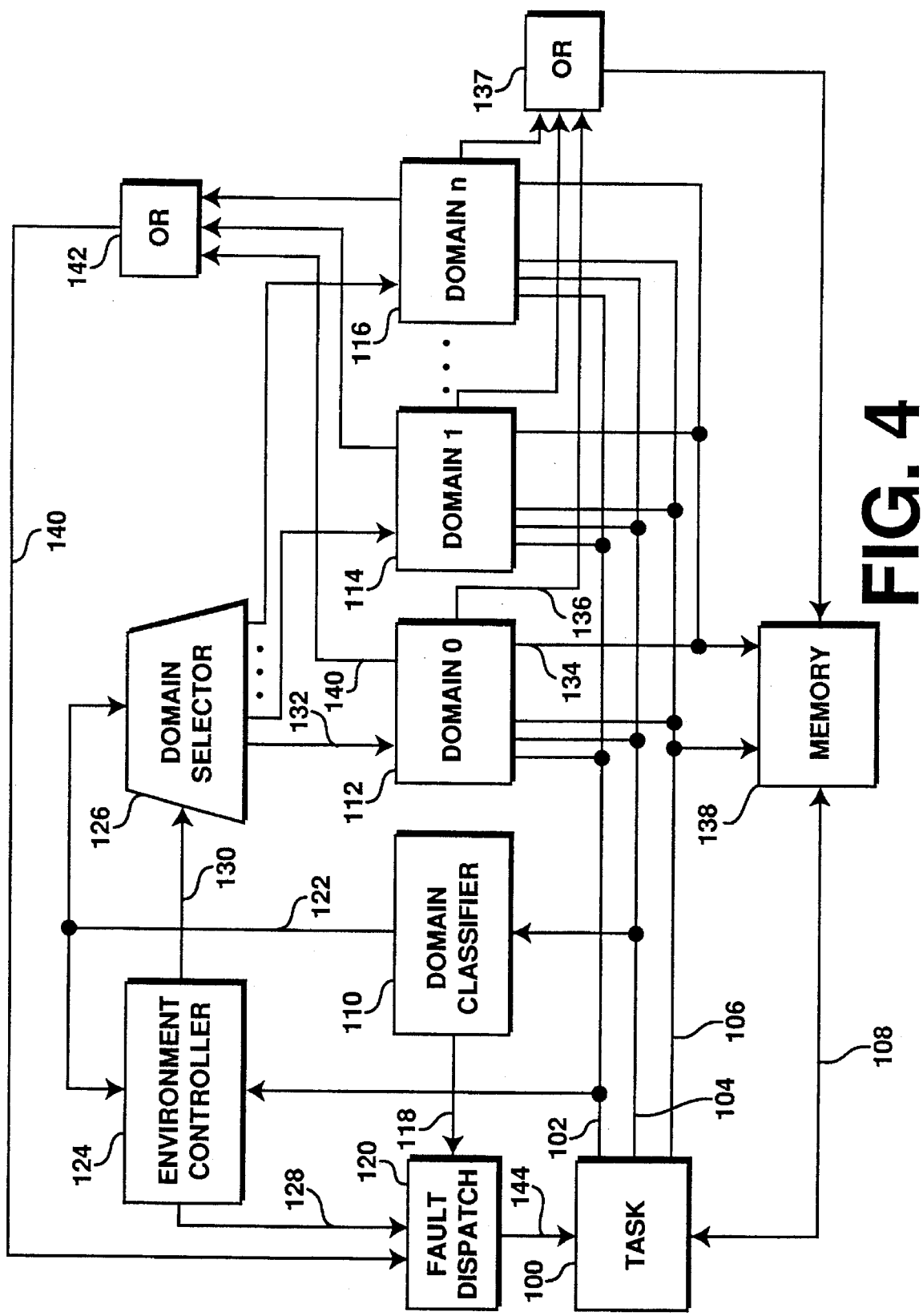
FIG. 4 is a block diagram illustrating the structural architecture of the memory manager of the operating system.
Figure 5:
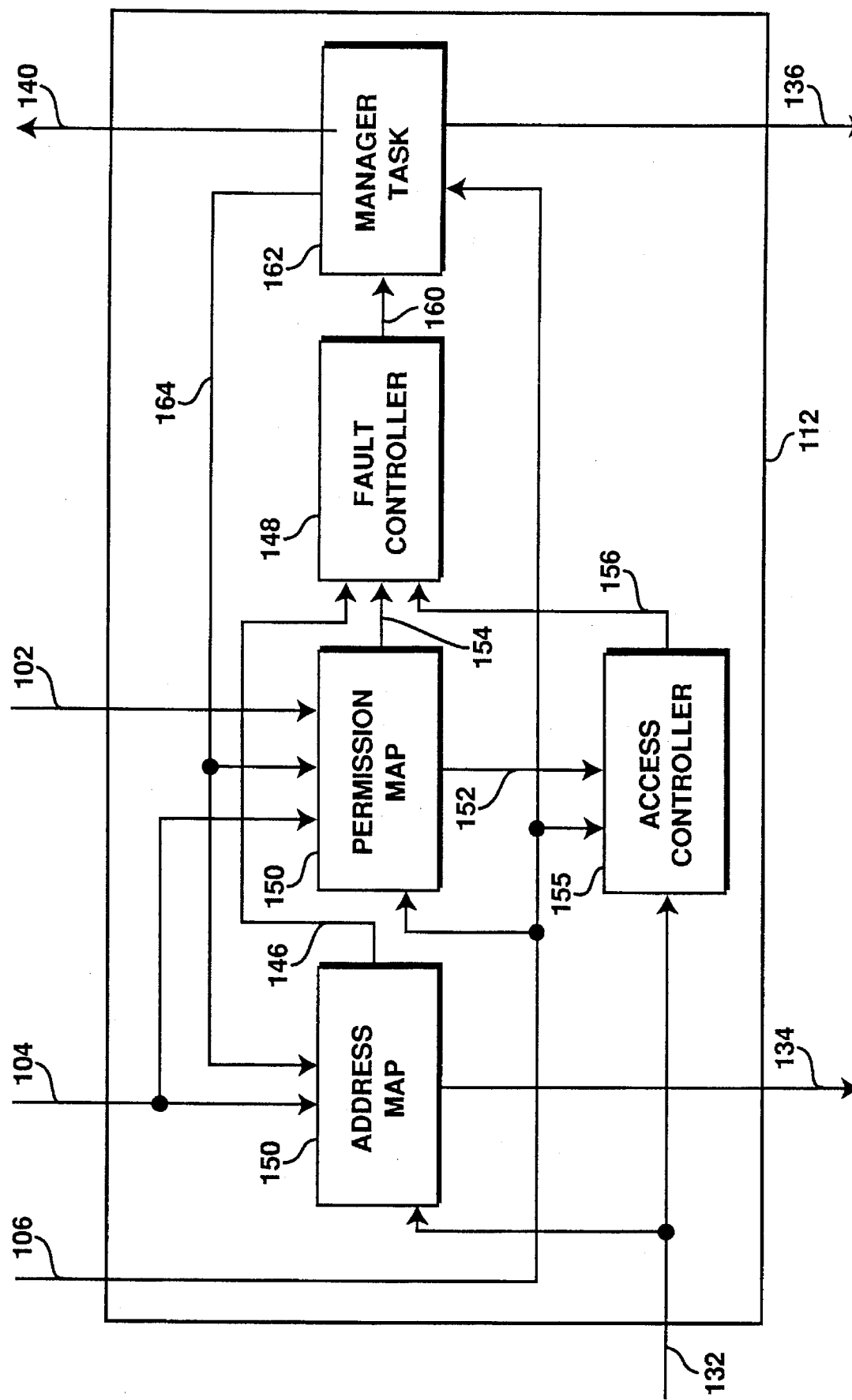
FIG. 5 is a block diagram further illustrating Domain 0 of FIG. 4.

With reference now to FIGS. 4 and 5, block diagrams illustrating the operation of the memory manager of the operating system are shown. Although the schematic nature of FIGS. 4 and 5 could be interpreted to imply that the memory manager of the operating system is implemented in hardware, the blocks of FIGS. 4 and 5 are intended to represent structural elements of the memory manager as implemented in software. Naturally, the memory manager could also be implemented in hardware, or a combination of hardware and software, provided a schematic flow similar to that illustrated was followed. But, since operating systems are typically implemented in software, it is therefore preferable to implement the memory manager of such an operating system in software as well. Regardless of the method of implementation, however, FIGS. 4 and 5 work well to illustrate the concepts of domains and environments as used within a memory manager of an operating system.

With reference now to FIG. 4, during the execution of a task 100, a memory operation is performed which provides the following informational signals to the operating system: a specification of the environment 102 that the task is running in; the target virtual address 104, the access type 106, and data 108, as necessary, associated with the memory operation. That information is then used by the memory manager of the operating system to control the performance of the memory operation. The domain classifier 110 receives the target virtual address 104 and determines the domain where the target virtual address 104 resides. The operating system may comprise a large number of domains, such as, for example, $domain_0$ 112, $domain_1$ 114 through $domain_n$ 116. If the domain classifier 110 cannot determine the domain where the target virtual address 104 resides, a domain fault signal 118 is generated by the domain classifier 110 and sent to the fault dispatch 120 for the task 100. Fault dispatch 120 will be further explained below. If a domain can be found for the target virtual address 104, a domain specifier signal 122 is generated by the domain classifier 110 and conveyed to the environment controller 124 and the domain selector 126.

The environment controller 124 receives the environment specifier 102 from task 100, and together with the domain specifier 122, determines if the domain indicated by the domain specifier 122 is part of the task's environment. If the domain is not part of the task's environment, a domain access violation signal 128 is generated and sent to fault dispatch 120. Otherwise, an authorization signal 130 is generated and sent to domain selector 126. After being so authorized, domain selector 126 uses domain specifier 122 to enable the domain specified by the domain classifier 110 via one of the plurality of enable lines 132.

Each of the domains 112 through 116 receives the environment specifier 102, the target virtual address 104, and the access type 106 from the executing task 100. Each domain has a separate enable 132 line, and only the domain indicated by domain specifier 122 is actually provided with an enable signal over enable 132. After being enabled, a domain, such as domain 112, determines if the desired memory operation is to be performed. If the memory operation is to be performed, the domain generates the physical address 134 corresponding to the target virtual address 104, along with a memory operation enable signal 136. After passing through OR gate 137, enable signal 136 is conveyed to memory 138, which also receives the access type 106 of the task 100. In addition, depending on the access type 106, data 108 is either received in memory 138 from task 100 or output to the task 100 from memory 138. If the domain 112 determines that the memory operation is not to be performed, the domain 112 generates an access violation signal 140, which after passing through OR gate 142, is conveyed to fault dispatch 120. If fault dispatch 120 receives either a domain fault 118, a domain access violation 128, or an access violation 140, it issues a fault signal 144 to task 100 halting the execution of the task 100.

It should also be noted that in accordance with the present invention, each domain corresponds to an overall predetermined set of rules for the control of the performance of a memory operation. To the extent that a domain performs a different address-oriented service from another domain, the rules defining that service are different from the rules defining other services. These types of rules are domain-dependent rules. To the extent that a domain performs the same functions as any other domain, such as virtual to physical address translation, the rules which control the performance of the memory operation are the same for each domain. These rules are domain-independent rules. With reference now to FIG. 5, the specific operation of a domain, and the specific implementation of the aforementioned rules, will be further illustrated. As specified above, with reference to FIG. 4, a domain, such as domain 112, receives environment specifier 102, target virtual address 104, access type 106, and enable 132. After processing this information in accordance with the above description, the domain then either emits the physical address 134 and the enable 136 to memory 138, or the access violation 140 to fault dispatch 120, provided that the domain 112 is enabled to perform such operations. If the domain 112 is enabled, the address map 145 either translates the target virtual address 104 into the physical address 134, or generates an address translation fault 146. Address translation fault 146 is generated if no physical address is found to correspond to the target virtual address 104. If an address translation fault 146 is generated, it is sent to domain fault controller 148.

The permission map 150 takes the target virtual address 104 and the environment specifier 102 and maps the intersection into a permission, which is generated as access permission signal 152. If there is no permission at the intersection of the target virtual address 104 and the environment specifier 102, a permission translation fault signal 154 is generated. If the permission mapping was successful, the permission 152 is received by access controller 155, along with the access type 106 and enable 132. Access controller 155 then generates an access denial signal 156 if the access type 106 is not allowed by the domain 112.

Access denial 156 is conveyed to the domain's fault controller 148. Fault controller 148 monitors the various types of fault conditions and emits an inhibit signal 160 to the manager task 162 if any of the fault conditions are present. Upon receipt of inhibit 160, which specifies the type of fault that occurred, the manager task 162 of domain 112 will typically generate access violation 140, unless the manager task 162 determines that it could make modifications to the address map 145 and/or the permission map 150 via map modification signal 164 that would allow the memory operation to be performed. If the manager task 162 does not receive inhibit 160, the memory operation specified by the task 100 is allowed to be performed, via issuance of enable 136 to memory 138.

4.0 Domain-Based Memory Management Unit of Present Invention

Having described a general architecture of the operating system for use in conjunction with the MMU of the present invention, it should be noted that the concepts of domains and environments can be used in a number of additional ways to manage the addresses of a computer system. In particular, since an MMU typically performs the primary functions of virtual to physical address translation and memory access permission, an MMU is particularly well suited for carrying out many of the concepts illustrated with reference to the memory manager of the operating system of the present invention. This is especially true because these concepts allow the MMU to be readily extended to performing additional address-oriented services, in addition to virtual memory.

Figure 6:
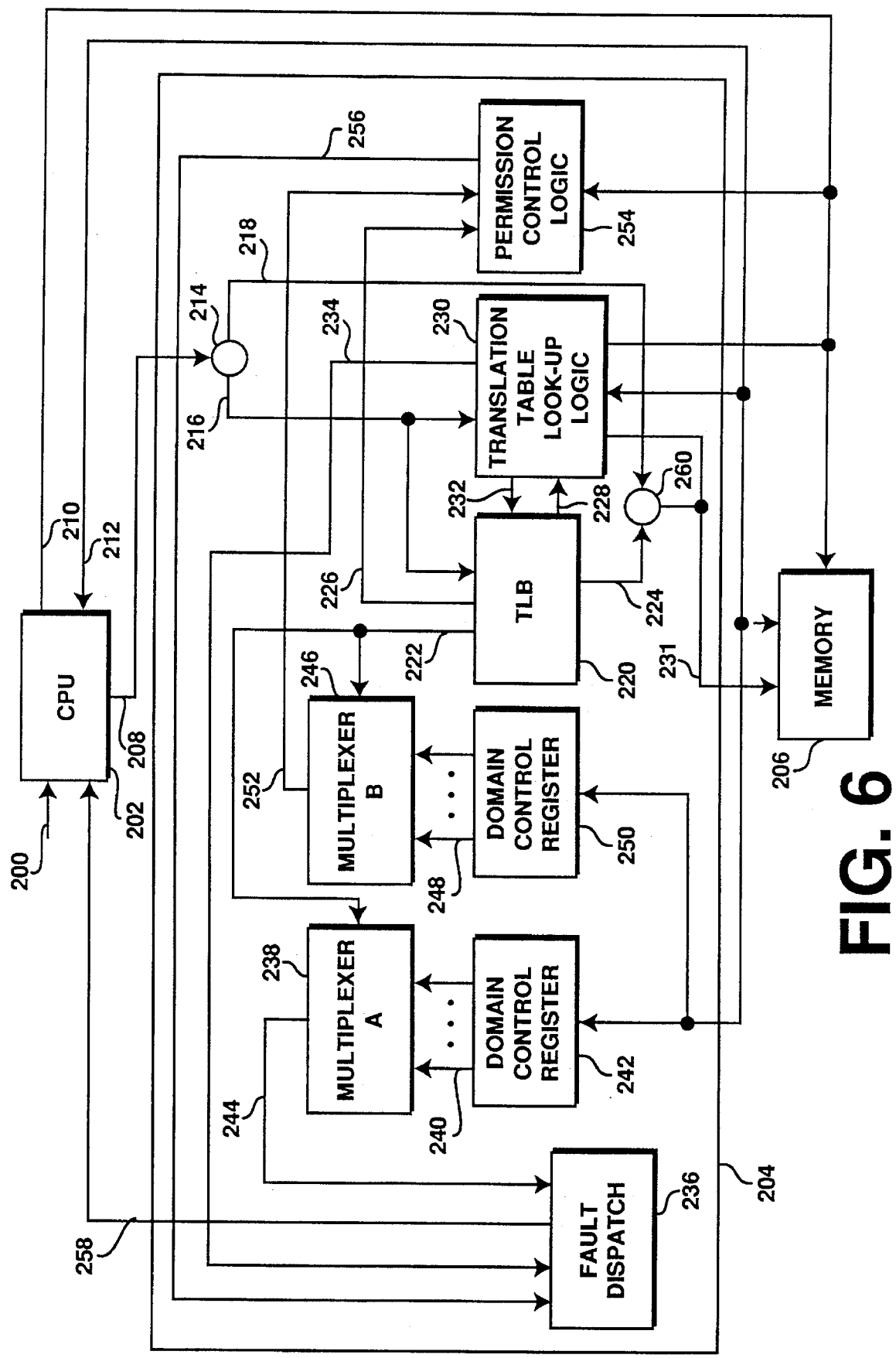
FIG. 6 is a schematic diagram illustrating the function of the memory management unit of the preferred embodiment of the present invention.

Before describing the operation of a preferred embodiment of the MMU of the present invention, it is necessary to describe how the hardware concepts described below are related to the software structures in the memory architecture described above. First, the management of addresses by the operating system naturally involves managing the performance of memory operations in hardware. As further described below with reference to FIG. 6, many of these memory operations are controlled in the translation look aside buffer (TLB), in conjunction with an associated translation table, of the MMU.

Thus, it could be said that the state of the MMU at any moment in time is associated with some set of domains. This set of domains, however, is limited because although the operating system can support a large number of domains, the hardware of the MMU is limited to supporting only a small number of domains at one time. For example, the MMU of the present invention is designed to only support 16 domains at one time.

To enhance the MMU's ability to support more than a limited number of domains, the operating system is responsible for translating the virtual addresses associated with a memory operation corresponding to one domain into a domain number, which is then used in place of the domain by the MMU. A domain number in the small integer range is preferred because the domain number is stored in the translation look-aside buffer in the MMU, and is used to index hardware resident tables, and the performance of these two parts is affected by the size of the domain number. For example, the access time of the translation lookaside buffer is dependent on the amount of data that resides there, and the indexing time for a hardware resident table is particularly critical to the size of the domain number. In addition, because the number of operating system domains is greater than the number of MMU domain numbers, the operating system must occasionally reassign domains to different domain numbers as necessary.

If the operating system has not assigned a domain number to a domain which a task attempts to access, the memory operation of the task will not be capable of being performed, as indicated by a domain fault, further described below. The domain fault will signal the operating system to assign a domain number to the domain in question, possibly replacing a previous domain. Once this assignment has been performed, the task that faulted can be rerun and it will retry the memory operation. Because the domain has now been assigned a domain number, the domain fault will not occur and the memory operation can proceed as described below.

The state of the CPU at any moment in time is likewise associated with a task running in a particular environment. When the operating system runs a task on the CPU, the CPU's state is initialized to reflect the state of a task and its environment. The state of a task is normally determined by the general purpose registers of the CPU. The environment is determined by the state of special purpose registers, the domain control register and the manager control register, which are further described below.

Based upon the above description, it can be said that conceptually, the TLB and translation table of the MMU are comprised of a domain classifier, a permission map, and an address map. These elements are similar in function to those same elements as described above with reference to the operating system. There are some differences, however, which should be clarified: (1) the domain classifier of the MMU emits a domain number, as described below, instead of a domain specifier, as described above with reference to the operating system; and (2) there is only a single address and permission map supported by the TLB and translation table.

The MMU of the preferred embodiment of the present invention, which implements the conceptual elements described above, is further illustrated in FIG. 6. Upon receipt of instructions 200 from the operating system and/or an application program, CPU 202 emits a number of different information and control signals to MMU 204 and memory 206 for the purpose of performing various memory operations. The signals emitted by CPU 202 include a virtual address signal 208 and an access type signal 210. In addition, if the memory operation is a write operation, the CPU 202 also emits a data signal 212. The address conveyed by virtual address signal 208 is broken-up by the MMU 204, at node 214 into a virtual page number signal 216 and page offset signal 218. Splitting the address into a virtual page number 216 and page offset 218 has the effect of subdividing the system virtual address space into a number of fixed size pages of addresses. In the preferred embodiment of the present invention, pages are 4096 bytes in size and addresses are 32 bits in width. This implies that the virtual page number 216 is 20 bits wide and the page index is 12 bits wide.

The virtual page number 216 is conveyed to the transition look-aside buffer (TLB) 220, which compares the virtual page number 216 against a set of entries stored in the TLB 220. In the preferred embodiment of the present invention, the TLB 220 is implemented with a content addressable memory (CAM), however other implementations, such as a set associative cache, are also possible. The CAM is composed of a page number table having a multitude of entries that each consist of a tag portion and a data portion. The tag portion consists of a register and an equality comparator. The register is used to hold a virtual page number. The data portion consists of three registers that hold a domain number, a physical page number, and a permission, respectively. When the virtual page number signal 216 is conveyed to the TLB 220, the page number signal 216 is conveyed to each of the tags in each entry. All of the tags simultaneously compare their register contents against the virtual page number signal 216 using their equality comparators. If one of the tags matches, an output of the equality comparator will be conveyed to the corresponding data portion. The corresponding data portion will emit the contents of its registers as a domain number signal 222, a physical page number signal 224, and a permission signal 226. If none of the entries match, then a no-match signal 228 will be emitted to the translation table look-up logic 230.

Upon receipt of no-match signal 228 from the TLB 220, translation table look-up logic 230 takes the virtual page number 216 and uses it to access a translation table in memory 206, through address line 231. If a valid entry in this translation table matches the virtual page number 216, then look-up logic 230 will convey TLB entry information 232 for the page number table back to the TLB 220 for use by the CAM. If a valid entry does not exist, look-up logic 230 emits a translation fault signal 234 to fault dispatch unit 236. The table look-up operation performed by the translation table look-up logic 230 will be further described in FIG. 7 below.

The information emitted by the TLB 220 is utilized in the performance of the memory operation. As indicated above, domain number 222 corresponds to a domain in the operating system. The domain number 222 is used by multiplexer A 238 to select a bit from all of the bits 240 issued by the domain control register 242. The selected bit, based on data input by data signal 212, indicates if the memory operation is allowed to access the domain corresponding to the domain number 222. If the memory operation is not allowed to access the selected domain, then a domain access fault 244, which corresponds to the selected bit described above, is conveyed to the fault dispatch unit 236. The multiplexer A 238, the multiplexer B 246, the domain control register 242, and the manager control register 250 represent an environment controller.

The domain number 222 is also conveyed to multiplexer B 246 to select a bit from all of the bits 248 issued by the manager control register 250. The selected bit, again based on data signal 212, indicates if the executing task is a manager of the domain corresponding to the domain number 222. The selected bit is conveyed as the manager enable signal 252 to permission control logic 254. The use of this manager enable signal 252 will be described below. The manager control register 250 allows the manager of a domain to access the addresses corresponding to that domain without being restricted by the permissions that the manager has imposed on the memory operations of its clients.

The access type 210 defines the kind of memory operation being performed by the CPU 202. There are three kinds of memory operations: read, write and instruction fetch. Permissions as conveyed by permission signal 226 are utilized to restrict which memory operations can be performed by the CPU 202. A permission is associated with a page of virtual addresses and restricts the allowable memory operations on that page. For example, a permission can be used to allow read operations on a page, but not allow write operations or instruction fetch operations. The permission emitted by the TLB 220 is received by the permission control logic 254 along with the access type 210 from the CPU 202 and manager enable signal 252. The permission control logic 254 then determines if the access type is allowed by the permission signal 226, and not overridden by manager enable signal 252. If the access type is not allowed, a permission fault 256 is generated and conveyed to the fault dispatch 236, otherwise the memory operation is permitted. The manager enable signal 252 overrides the permission signal 226 conveyed by the TLB 220 and allows any access type 210 to be performed.

If a domain fault 244, translation fault 234, or a permission fault 256 has been conveyed to fault dispatch 236, then a fault signal 258 is issued by fault dispatch 236 back to CPU 202. The transmission of a fault from the MMU 204 to the CPU 202 causes the operation currently in progress to be canceled, as described above, and execution (often through a vector table) of a fault handling routine by the CPU 202. If neither domain fault 244, translation fault 234 or permission fault 256 is generated, then physical page number signal 224 emitted by the TLB 220 is combined with page offset signal 218 emitted by the CPU 202 at node 260 to generate a physical memory address over address line 231. The physical memory address is conveyed to memory 206 along with access type 210 from the CPU to perform the memory operation initiated by the CPU 202. In response, the memory 200 either conveys data 212 to the CPU 202 for either a read or an instruction fetch access type, or accepts data 212 from the CPU 200 for a write access type. At this point the memory operation is complete.

As mentioned above, the translation table lookup logic 230 also uses the memory 206 during certain lookup operations (memory operations). Typically, such look-up operations would be performed by the translation table lookup logic 230 by conveying a physical address (over physical address line 231) and an access type 210 to the memory 206. The memory, in turn, would deliver data 212 during a read access type operation, designated by access type 210, or accept data from the translation table lookup logic 230 during a write access type operation, also designated by access type 210. In the preferred embodiment of the present invention, however, the translation table lookup logic 230 only performs read access type operations. In the discussion below about the operation of the translation table lookup logic 230, all memory operations are performed in the manner described herein.

As previously mentioned, upon receipt of no-match signal 228 from the TLB 220, look-up logic 230 either generates entry information for the page number table of the TLB 220 or generates a translation fault signal 234 to the fault dispatch unit 236. The logical operations which are performed by translation table look-up logic 230 through memory 206 are explained in greater detail with reference now to FIG. 7. First, within the look-up logic 230, the page number 216 emitted by the CPU 202 is decomposed into two parts, a section number 302 and a page index 304. The section number 302 is then combined at node 306 with the contents 308 of the base register 310 to create a physical address, first level table entry address 312, to address the base of the first level table 314. Base register 310 is initialized by the operating system, for example, through data signal 212.

The first level table entry address 312 is then used to access a first level table entry 316 in the first level table 314 as a result of a memory read operation. The first level table entry 316 is composed of a page table base address 318, a domain number 320 and a first level entry valid bit 322. The first level entry valid bit 322 is conveyed to translation sequence logic 323 of control logic 324 of look-up logic 230. If the first level entry valid bit 322 is "0", then translation sequence logic 323 terminates the look-up operation and conveys the translation fault 234 to the fault dispatch unit 236 of the MMU 204; otherwise, the look-up operation continues. The domain number 320 is stored in the entry register 326. The page table base address 318 is combined at node 328 with the page index 304 to create a second level table entry address 330. The second level table entry address 330 is used to access a second level table entry 332 in the second level table 334 as a result of a memory read operation.

The second level table entry 332 is composed of a page base address 336, an access permission 338, and a second level entry valid bit 340. The second level entry valid bit 340 is conveyed to translation sequence logic 323 of control logic 324. If the second level entry valid bit 340 is "0", then the control logic 324 terminates the look-up operation and conveys a translation fault 234 to the fault dispatch unit 236 of the MMU 204; otherwise, the look-up operation continues. The page base address 336 and access permission 338 are stored in the entry register 326. The section number 302 and the page index 304 are also stored in the entry register 326. At this point, the contents of the entry register 326 are conveyed to the TLB 220 along with a TLB entry number 342 as TLB entry information 232. The TLB 220 then uses the TLB entry number 342 to select a TLB entry register. The contents of this TLB entry register are then replaced with the contents of the entry register 326 to complete the look-up operation. Once the TLB entry register has been filled, the TLB 220 again compares the virtual page number 216 against the page number table of the CAM, and upon finding a match (as it surely will now that the proper information has been stored in the CAM), emits the domain number signal 222, the physical page number signal 224, and the permission signal 226. Forwarding logic could also be used to forward the content of the TLB entry register once it was filled, but simply retrying the matching operation avoids the extra cost of including such logic.

The TLB entry number is generated by the TLB entry replacement logic 344. The TLB entry replacement logic 344 is initialized by a reset 346 to a known state whenever the MMU is reset. In the preferred embodiment of the present invention, the TLB entry number 342 is generated by the TLB entry replacement logic 344 using a pseudo-random number generator. Other implementations, such as a counter, are also possible.

Figure 7:
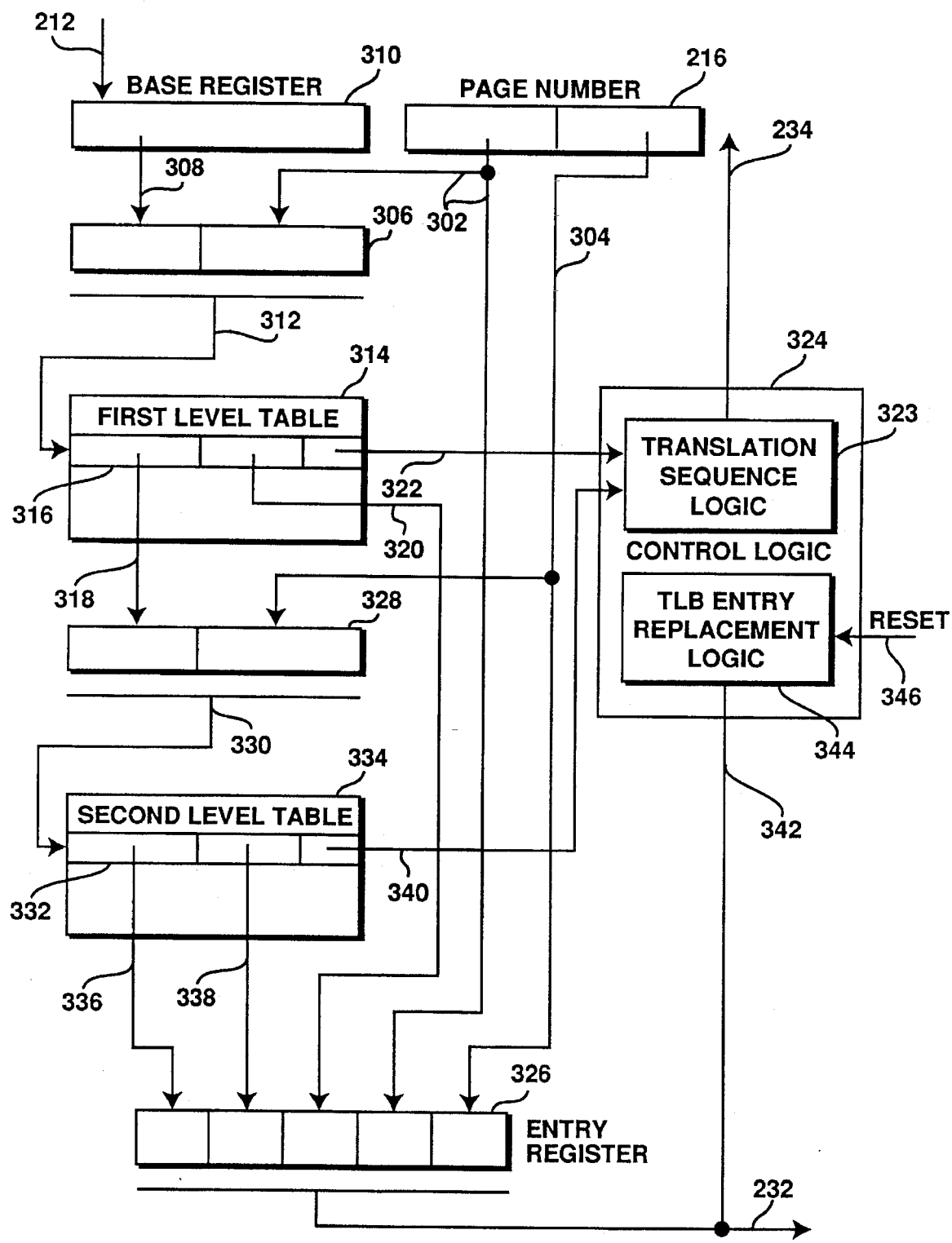
FIG. 7 block diagram illustrating the operation of the translation table lookup logic of FIG. 6.

With continued reference to FIG. 7, in the preferred embodiment of the present invention, the virtual address space is decomposed into 1 megabyte sections. Each section is further divided into 256 4 kilo-byte pages. The first level table 314 contains entries that correspond to 1 megabyte sections. The section number 302 described above specifies the section that a given virtual address resides in. Because the domain number 320 is stored in the first level table 314, and because first level table entries 316 are associated with sections, the smallest domain supported by this hardware is 1 megabyte in size. The second level table 334 contains entries that correspond to 4 kilo-byte pages within a section. The page index 304 described above specifies the page within a section that a given virtual address resides in.

Because addresses in the preferred embodiment of the present invention are 32 bits wide, the section number is 12 bits wide and the page index is 8 bits wide.

Although the present invention has been described with reference to FIGS. 1a through 7 and with emphasis on a particular MMU embodiment, it should be understood that the figures are for illustration only and should not be taken as limitations upon the invention. It is contemplated that many changes and modifications may be made by one of ordinary skill in the art to the elements, process and arrangement of steps of the process of the invention without departing from the spirit and scope of the invention as disclosed above.

I claim:

1. A memory management unit for communicating with a CPU and a memory of a computer system to control said CPU's right to access said memory in order to initiate performance of an operation, wherein the memory comprises a single address space, said memory management unit comprising;

a plurality of domains, each individual domain corresponding to an address-oriented service and a set of addresses in the single address space of the memory, wherein each address in the single address space is only associated with one of the plurality of domains;

a plurality of environments, wherein an environment controls access by an associated task to the plurality of domains;

a translator coupled to receive a virtual address signal and an access type signal issued by said CPU during execution of a task, wherein said translator translates said virtual address signal into a physical address signal and issues said physical address signal to said memory in order to initiate performance of said operation, and wherein said translator issues a domain number signal that indicates one of said plurality of domains in which said virtual address resides based on said virtual address, and further wherein said translator determines if faults occur during translation of said virtual address and issues a first fault indication if one or more faults occur during translation of said virtual address; and an environment controller coupled to receive said domain number signal, wherein said environment controller permits access by said task to said one of said plurality of domains if said one of said plurality of domains is within a set of allowed domains, said environment controller issuing a second fault indication if said domain number signal does not correspond to an allowed domain number, such that said CPU's right to access said memory is denied if said first fault indication, said second fault indication, or both said first fault indication and said second fault indication are generated.

2. A memory management unit as recited in claim 1, wherein said translator comprises:

a domain classifier coupled to receive said virtual address signal for generating said domain number signal in response to a portion of the virtual address signal and issuing a domain fault indication if there is no domain number associated with said virtual address signal;

an address translator coupled to receive said virtual address signal for translating said virtual signal into said physical address signal if a corresponding physical address exists, but issuing a translation fault indication if there is no physical address corresponding to said virtual address signal; and a permission translator for receiving said virtual address signal and said access type signal and translating said virtual address signal into a permission signal if an access type corresponding to said access type signal is allowed by a permission corresponding to said permission signal, but issuing a permission fault indication if said access type corresponding to said access type signal is not allowed by said permission.

3. A memory management unit as recited in claim 2, and further comprising a fault dispatcher for issuing a fault signal to said CPU if said fault dispatcher receives either said domain fault indication, said translation fault indication, said permission fault indication or said second fault indication.

4. A memory management unit as recited in claim 2, wherein said environment controller includes:

a domain control register coupled to receive a data signal issued by said CPU and issuing a plurality of bits derived from said data signal;

a domain selector coupled to said domain control register and coupled to receive said domain number signal from said translator, wherein said domain selector selects a bit issued by said domain control register which corresponds to said domain number and issues said second fault indication so as to prevent initiation of performance of said operation if said bit selected by said selector indicates that said CPU is not allowed access to a domain corresponding to said domain number;

a manager control register coupled to receive said data signal issued by said CPU and issuing a plurality of bits derived from said data signal; and a manager selector coupled to said manager control register and coupled to receive said domain number signal from said translator, wherein said manager selector selects a bit issued by said manager control register which corresponds to said domain number and issues a manager enable signal for overriding said permission fault indication so as to allow initiation of performance of said operation.

5. A memory management unit as recited in claim 1, wherein said translator comprises:

means for dividing said virtual address signal into a virtual page number signal and a page offset signal;

translation means for receiving said page number signal and, if said virtual page number signal can be translated into a physical page number and a domain number and a permission, issuing a physical page number signal and said domain number signal and a permission signal, but if said virtual page number signal cannot be translated into said physical page number and said domain number and said permission, then issuing a translation fault signal, said translation fault signal forming a first part of said first fault indication;

permission control logic for receiving said permission signal and said access type signal, determining if an access type corresponding to said access type signal is allowed by said permission signal, and issuing a permission fault signal if said access type signal is not allowed, said permission fault signal forming a second part of said first fault indication; and means for combining said physical page number signal and said page offset signal to produce said physical address signal.

6. A memory management unit as recited in claim 5, wherein said translation means includes:

a translation look-aside buffer for receiving said virtual page number signal, comparing said virtual page number signal to a page number table of said translation look-aside buffer and if said virtual page number signal corresponds to a page number entry in said page number table, then issuing said physical page number signal and said domain number signal and said permission signal, but if said virtual page number component does not correspond to a page number entry in said page number table, then issuing a no-match signal; and translation table look-up logic for receiving said no-match signal and said virtual page number signal and transmitting a page number entry to said translation look-aside buffer if an entry stored in said memory corresponds to said virtual page number signal, but issuing said translation fault signal if no entry stored in said memory corresponds to said virtual page number signal.

7. A memory management unit as recited in claim 6, wherein said environment controller includes:

a control register coupled to receive a data signal issued by said CPU and issuing a plurality of bits derived from said data signal; and a selector coupled to the control register and coupled to receive said domain number signal from said translator, wherein the selector selects a bit issued by said control register which corresponds to said domain number and issues said second fault indication so as to prevent initiation of performance of said operation if said bit selected by said selector indicates that said CPU is not allowed access to a domain corresponding to said domain number.

8. A memory management unit as recited in claim 6, and further comprising a fault dispatcher for receiving said first fault indication from said translation means, said permission fault signal from said permission control logic, and said second fault indication from said environment controller, and issuing a single fault signal to said CPU.

9. A memory management unit as recited in claim 6, wherein said translation look-aside buffer is a content addressable memory.

10. A memory management unit as recited in claim 1, wherein said environment controller includes:

a control register coupled to receive a data signal issued by said CPU and issuing a plurality of bits derived from said data signal; and a selector coupled to the control register and coupled to receive said domain number signal from said translator, wherein the selector selects a bit issued by said control register which corresponds to said domain number and issues said second fault indication so as to prevent initiation of performance of said operation if said bit selected by said selector indicates that said CPU is not allowed access to a domain corresponding to said domain number.

11. A memory management unit as recited in claim 1, wherein said domain number is selected from among a small range of domain numbers.

12. A computer system having a memory and memory management unit for communicating with a CPU of said computer system to control said CPU's right to access said memory in order to initiate performance of an operation, wherein the memory comprises a single address space, said memory management unit comprising:

a plurality of domains, each individual domain corresponding to an address-oriented service and a set of addresses in the single address space of the memory, wherein each address in the single address space is only associated with one of the plurality of domains;

a plurality of environments, wherein an environment controls access by an associated task to the plurality of domains;

a translator coupled to receive a virtual address signal and an access type signal issued by said CPU during execution of a task, wherein said translator translates said virtual address signal into a physical address signal if a physical address corresponding to said virtual address resides in said translator, said translator translating said virtual address signal into said physical address signal according to an entry signal corresponding to said virtual address, and wherein said translator issues said physical address signal to said memory in order to initiate performance of said operation, and further wherein said translator issues a domain number signal indicating one of said plurality of domains corresponding to a set of addresses in which said virtual address resides, and wherein said translator determines if faults occur during translation of said virtual address and issues a first fault indication if one or more faults occur during translation of said virtual address; and an environment controller coupled to receive said domain number signal to control access to domains that correspond to address-oriented services that are identified by domain numbers and wherein said environment controller determines if said one of said plurality of domains specified by the translator by the domain number signal is within an allowed set of domains and permits access by said task to one of said address-oriented services if said domain is within said allowed set of domains, said environment controller issuing a second fault indication if said domain number signal does not correspond to an allowed domain, such that said CPU's right to access said memory is denied if said first fault indication or said second fault indication is generated.

13. A computer system as recited in claim 12, wherein said translator comprises:

means for dividing a virtual address signal into a virtual page number signal and a virtual page offset signal;

translation means for receiving said page number signal, translating said virtual page number signal into a physical page number and a domain number and a permission, and issuing a physical page number signal and said domain number signal and a permission signal if said virtual page number signal can be translated, but issuing a translation fault signal forming a first part of said first fault indication if said virtual page number cannot be translated;

permission control logic for receiving said permission signal and said access type signal, determining if an access type corresponding to said access type signal is allowed by said permission signal, and issuing a permission fault signal if said access type signal is not allowed, said permission fault signal forming a second part of said first fault indication; and means for combining said physical page number signal and said page offset signal to produce said physical address signal.

14. A computer system as recited in claim 13, wherein said translation means includes:

a translation look-aside buffer for receiving said virtual page number signal, comparing said virtual page number signal to a page number table of said translation look-aside buffer, and if said virtual page number signal corresponds to a page number entry in said page number table, then issuing said physical page number signal and said domain number signal and said permission signal, but if said virtual page number signal does not correspond to a page number entry in said page number table, then issuing a no-match signal; and translation table look-up logic for receiving said no-match signal and said virtual page number signal, determining if a valid page number entry exists in said memory for said virtual page number signal, and filling an entry register of said page number table with said valid page number entry if said valid page number entry exists, but issuing said translation fault signal if said valid page number entry does not exist.

15. A computer system as recited in claim 14, wherein said environment controller includes:

a control register coupled to receive a data signal issued by said CPU and issuing a plurality of bits derived from said data signal; and a selector coupled to said control register and coupled to receive said domain number signal from said translator, wherein said selector selects a bit issued by said control register which corresponds to said domain number and issues said second fault indication if said bit selected by said selector indicates that said CPU is not allowed access to a domain corresponding to said domain number.

16. A computer system as recited in claim 15, and further comprising a fault dispatcher for receiving said first fault indication from said translation means, said permission fault signal from said permission control logic, and said second fault indication from said environment controller and issuing a single fault signal to said CPU.

17. A computer system as recited in claim 14, wherein said translation table look-up logic is operative to emit a first level table entry address to said memory in response to said receipt of said no-match signal, and wherein said memory comprises a translation table for receiving said first level table entry address and supplying a valid page number entry for said page number table of said translation look-aside buffer.

18. A computer system as recited in claim 17, wherein said memory includes:

a first level table for receiving said first level table entry address and issuing a domain number entry, a second level table base address, and a first level entry valid indicator; and a second level table for receiving a second level table entry address based on said second level table base address and issuing a physical page number entry, a permission entry, and a second level entry valid indicator.

19. A computer system as recited in claim 13, wherein said environment controller includes;

a domain control register coupled to receive a data signal issued by said CPU and issuing a plurality of bits derived from said data signal;

a domain selector coupled to the domain control register and coupled to receive said domain number signal from said translator, wherein said domain selector selects a bit issued by said domain control register which corresponds to said domain number and issues said second fault indication so as to prevent initiation of performance of said operation if said bit selected by said selector indicates that said CPU is not allowed access to a domain corresponding to said domain number;

a manager control register coupled to receive said data signal issued by said CPU and issuing a plurality of bits derived from said data signal; and a manager selector coupled to the manager control register and coupled to receive said domain number signal from said translator, selecting a bit issued by said manager control register which corresponds to said domain number and issues a manager enable signal for overriding said permission fault signal so as to allow initiation of performance of said operation.

20. A computer system as recited in claim 12, wherein said environment controller includes:

a control register coupled to receive a data signal issued by said CPU and issuing a plurality of bits derived from said data signal; and a selector coupled to said control register and coupled to receive said domain number signal from said translator, wherein said selector selects a bit issued by said control register which corresponds to said domain number and issues said second fault indication so as to prevent initiation of performance of said operation if said bit selected by said selector indicates that said CPU is not allowed access to a domain corresponding to said domain number.

* * * * *